United States Patent
Davis et al.

(10) Patent No.: US 8,146,805 B1
(45) Date of Patent: Apr. 3, 2012

(54) SYSTEMS AND METHODS FOR DEPOSITING CASH INTO DEPOSIT ACCOUNT

(75) Inventors: Stuart G. Davis, Helotes, TX (US); Maximiliano C. Juarez, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 309 days.

(21) Appl. No.: 12/427,867

(22) Filed: Apr. 22, 2009

(51) Int. Cl.
  *G06F 17/00* (2006.01)
  *G06F 19/00* (2011.01)
  *G06K 5/00* (2006.01)
  *G06Q 40/00* (2012.01)

(52) U.S. Cl. .......... 235/379; 235/375; 235/380; 705/35; 705/42; 705/43; 705/44

(58) Field of Classification Search .................. 235/375, 235/379, 380; 705/35–45
  See application file for complete search history.

(56) References Cited

U.S. PATENT DOCUMENTS

| | | | |
|---|---|---|---|
| 7,383,213 B1 * | 6/2008 | Walter | 705/35 |
| 2001/0034717 A1 | 10/2001 | Whitworth | |
| 2002/0128967 A1 | 9/2002 | Meyer et al. | |
| 2005/0177510 A1 | 8/2005 | Hilt et al. | |
| 2005/0197968 A1 * | 9/2005 | Das et al. | 705/64 |
| 2005/0289030 A1 * | 12/2005 | Smith | 705/35 |
| 2008/0006686 A1 | 1/2008 | Vallance | |
| 2009/0032580 A1 * | 2/2009 | Blachowicz et al. | 235/379 |
| 2009/0254479 A1 * | 10/2009 | Pharris | 705/42 |

OTHER PUBLICATIONS

Shelfer, Katherine M. et al.: "Smart Card Evolution", Communications of the ACM, Jul. 2002, vol. 45, No. 7, pp. 83-88.

* cited by examiner

*Primary Examiner* — Michael G Lee
*Assistant Examiner* — Laura Gudorf
(74) *Attorney, Agent, or Firm* — Perkins Coie LLP

(57) ABSTRACT

A deposit card may be issued to a user that allows the user to go to a merchant and deposit cash into a deposit account of the user using information from the deposit card. The deposit card is unidirectional as it only can be used to deposit money into the deposit account. A barcode may be generated and disposed on the deposit card or provided separately. The barcode represents data that may be used in the deposit of cash to the deposit account, such as the name or other identification of the user, a card number of the deposit card, the name or other identification of the institution, an account number of the deposit account, etc. A merchant may use a barcode reader to read the barcode and obtain data that may be used in the deposit.

19 Claims, 5 Drawing Sheets

SYSTEMS AND METHODS FOR DEPOSITING CASH INTO DEPOSIT ACCOUNT

BACKGROUND

A check is a negotiable instrument that instructs a financial institution, such as a bank, to pay an amount of money from a specific account held in the payor's name with that financial institution to an account held in the payee's name. Remote deposit of checks is well known. For example, the payee may scan a check into an electronic image using a scanning device and a computing device. The payee may then send the electronic image of the check to a financial institution. The financial institution may use the electronic image to credit funds to the payee.

However, a user has no way of remotely depositing cash. Depositing cash typically involves going to a local bank branch and physically depositing the cash at the bank, e.g., by presenting the cash to a bank teller or depositing the cash into an automated teller machine.

SUMMARY

In an implementation, a deposit card may be issued to a user that allows the user to go to a merchant and deposit cash into a deposit account of the user using information from the deposit card. The deposit card is unidirectional as it only can be used to deposit money into the deposit account and cannot be used to make purchases.

In an implementation, the deposit card may have a barcode disposed thereon. The barcode may represent data that may be used in the deposit of cash to the deposit account, such as the name or other identification of the user, a card number of the deposit card, the name or other identification of the institution that holds the deposit account, an account number of the deposit account, etc. The barcode may be directed to the unique card number of the deposit card. The merchant may use a barcode reader to read the barcode and obtain data that may be used in the deposit.

In an implementation, the user may send a cash deposit request to an institution system and in response to the cash deposit request, the institution system may generate a barcode and provide the barcode to the user. In an implementation, the barcode may comprise information directed to the amount of cash that the user has requested to deposit in the deposit account. The barcode may be provided as output on an output device of a computing device, such as displayed on a display of the computing device (e.g., on a display of a mobile device) or printed out from a printer of the computing device. The user may go the merchant and present or otherwise display the barcode to the merchant. The merchant may use a barcode reader to read the barcode and obtain data that may be used in a deposit of cash to the deposit account.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
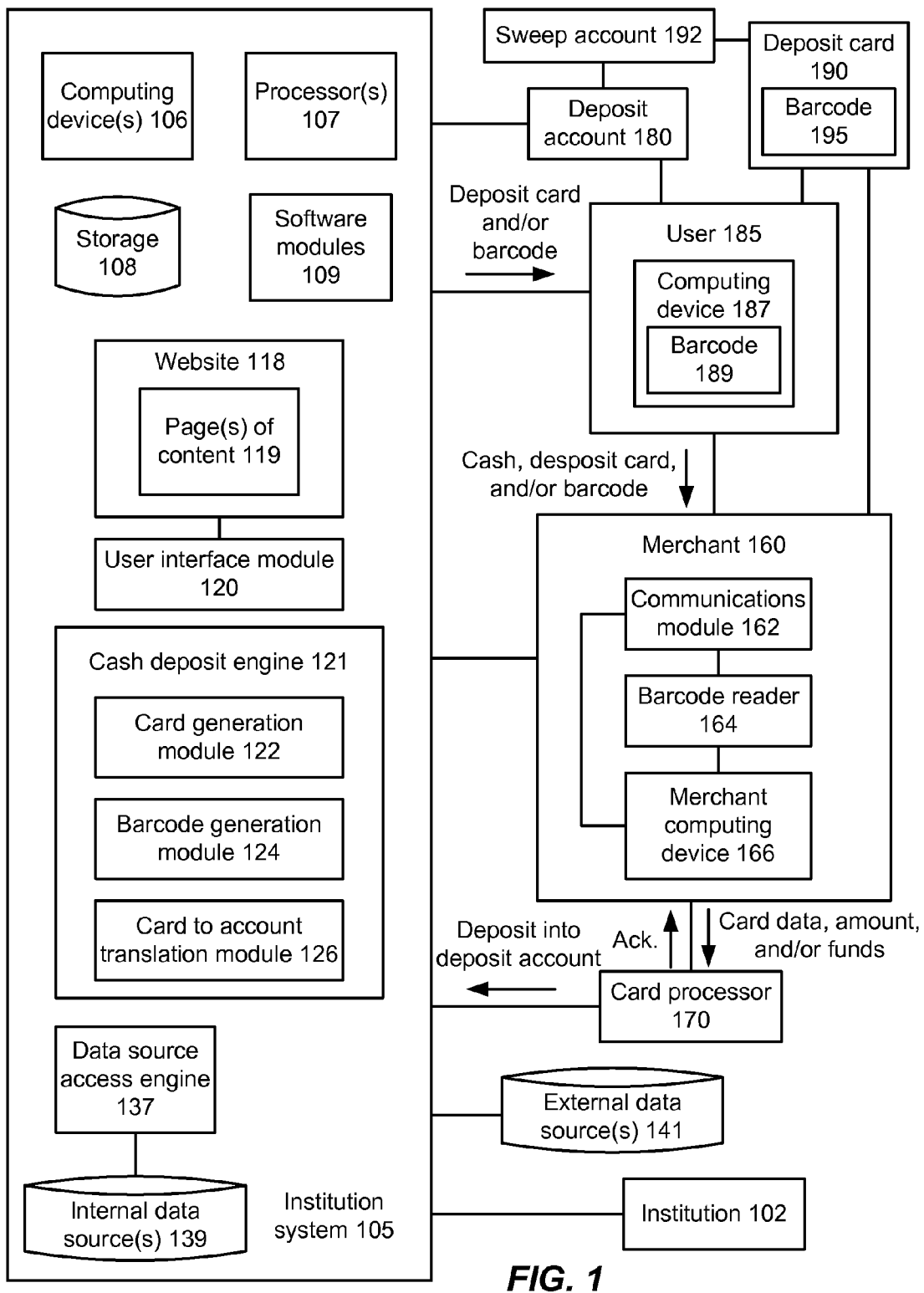
FIG. 1 is a block diagram of an implementation of a system that may be used in conjunction with depositing cash into a deposit account.

FIG. 1 is a block diagram of an implementation of a system that may be used in conjunction with depositing cash into a deposit account. An institution system 105 may be affiliated with an institution 102 which may be any type of entity capable of providing financial services, such as issuing financial cards, maintaining accounts involving financial cards, maintaining deposit accounts, and/or processing transactions involving financial cards or associated accounts. For example, the institution 102 may be any type of financial services company, a retail bank, an investment bank, an investment company, a regional branch of the Federal Reserve, a clearinghouse bank, and/or a correspondent bank.

A user 185 and an associated computing device 187 are shown. In an implementation, the user 185 may be an individual or other entity who owns a deposit account 180 that is held by the institution 102 and is accessible via the institution system 105. A deposit account is an account at an institution (here, the institution 102) that allows money to be deposited and withdrawn by the account holder (here, the user 185), with the transactions and resulting balance being recorded on the institution's books. The deposit account 180 may be any type of deposit account, such as a savings account, a checking account, a brokerage account, and the like.

The computing device 187 may be any type of personal computer (PC) or handheld computing device such as a personal digital assistant (PDA), a smartphone, or a mobile phone, for example. An example computing device is described with respect to FIG. 5.

The computing device 187 and the institution system 105 may be connected over a network. The user 185 may communicate with the institution system 105 by way of a communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 185 may also communicate with the institution system 105 by phone, email, instant messaging, text messaging, web chat, facsimile, mail, and the like.

The institution 102 or another entity may issue a deposit card 190 to the user 185 that allows the user 185 to deposit cash into the deposit account 180 using information from the deposit card 190. The deposit card 190 is a type of financial card that is unidirectional as it only can be used to deposit money into the deposit account 180 and cannot be used to make purchases (other than a purchase of a "deposit cash to the account associated with the card" or an equivalent, for example). If the deposit card 190 is lost or stolen, it is of no value to an unauthorized user because no value is stored on the deposit card 190. The deposit card 190 may comprise a magnetic stripe or chip (e.g., comprising embedded integrated circuits, non-volatile and/or volatile memory storage components, security logic, and/or microprocessor components) that contains data pertaining to the deposit card 190, the user 185, the institution 102, and/or the deposit account 180, for example. In an implementation, the deposit card 190 may be a "chip and PIN" card that uses smartcard technology and comprises an embedded microchip and is authenticated using a PIN (personal identification number).

In an implementation, the user 185 may go to a merchant 160, such as a supermarket, drugstore, discount store, financial services company (e.g., Western Union, MoneyGram, etc.), casino, and the like, and provide the deposit card 190 and cash to the merchant 160. The merchant 160 takes the cash and associates the cash with the deposit card 190 (e.g., rings up a purchase of a "deposit to the account associated with the card"). The merchant 160 may obtain card data (e.g., card number, user name, etc.) from the deposit card 190 and verify the data using an electronic verification system, for example. In an implementation, the verification may be performed using a known financial card payment terminal or point of sale system with a communications link to the institution 102 and/or a card processor 170. The merchant 160 may also associate the deposit (e.g., the purchase) with the institution 102 where the cash is being deposited.

In an implementation, the merchant 160 may provide the card data along with an amount of the deposit and/or funds (or payment data pertaining to the funds) to a card processor 170 (which may be separate from the institution 102 and institution system 105 or comprised within the institution 102 or institution system 105, depending on the implementation). The card processor 170 may verify that the card data is valid and initiate a transaction with the institution 102 to deposit the funds into the deposit account 180 that is tied to the card number of the deposit card 190. In an implementation, the card processor 170 may provide a conversion service to translate the card number of the deposit card 190 to an account number of the deposit account 180, and may deposit the funds into the deposit account 180.

In an implementation, the card processor 170 may collect payment data directed to the deposit and transmit payment data to a transaction collection system that may receive payment data from a distributed network in communication with a plurality of merchants to receive payment data from the plurality of merchants including the merchant 160. Using the payment data, the funds from the deposit may be provided to the institution 102 for deposit into the deposit account 180.

Upon receipt and approval of the card data, account data, payment data, and/or funds, the institution 102 may credit the funds to the deposit account 180. In this manner, the user 185 may deposit cash into their deposit account 180 without visiting a bank or an automated teller machine (ATM).

The deposit card 190 may be act as a sweep card that can be loaded at the merchant 160. In an implementation, a sweep account 192 may be provided, e.g., by the institution 102, that is associated with the deposit card 190. The user 185 may provide the deposit card 190 and the cash to the merchant 160 for loading with the funds of the cash. The merchant 160 may send the card data and the funds to the card processor 170 for loading the funds onto the deposit card 190. When the deposit card 190 is loaded, the funds may be loaded into the sweep account 192 associated with the deposit card 190 and swept (e.g., immediately) from the sweep account 192 to the deposit account 180. Thus, the deposit card 190 carries no value and is unidirectional as it may only be used for deposits.

The institution system 105 may provide the user 185 with information pertaining to merchants who may accept a cash deposit, such as which merchants are close to a particular location (e.g., the user's residence address, a current location of the user 185, etc.).

The merchant 160 may have a merchant computing device 166 and a communications module 162. The merchant computing device 166 may be used to read card data from the deposit card 190 (e.g., by the merchant 160 swiping the deposit card 190 through a magnetic reader, smart card reader, or point of sale terminal associated with the merchant computing device 166) or the merchant 160 may enter card data into the merchant computing device 160. The merchant 160 may also enter an amount of the deposit into the merchant computing device 160. The merchant computing device 160 may communicate with the card processor 170 and the institution system 105 over a communications network (e.g., intranet, Internet, LAN, WAN, WiFi, a PSTN, cellular, VOIP, etc.) via the communications module 162, for example. An example merchant computing device is described with respect to FIG. 5.

In an implementation, the deposit card 190 may have a barcode 195 disposed thereon. The barcode 195 may be any type of optical machine-readable representation of data. In an implementation, the barcode 195 may be a universal product code (UPC). The barcode 195 may represent data that may be used in the deposit of cash to the deposit account 180, such as the name or other identification of the user 185, a card number of the deposit card 190, the name or other identification of the institution 102, an account number of the deposit account 180, etc. The barcode 195 may be directed to the unique card number of the deposit card 190. The merchant 160 may use a barcode reader 164 (e.g., an optical scanner) to read the barcode 195 and obtain data that may be used in the deposit.

In an implementation, the user 185 may send a cash deposit request to the institution system 105 (e.g., via any electronic technique(s) such as a website 118 of the institution system 105 or by phone, facsimile, email, web chat, instant message, text message, and the like). The user 185 may access the institution system 105 by opening a communication pathway via the communications network using the computing device 187. There may be several ways in which the communication pathway may be established, including, but not limited to, an Internet connection via the website 118. The user 185 may access the website 118 and log into the website 118 using credentials, such as, but not limited to, a password and a username. The cash deposit request may identify the user 185, the deposit account 180, and an amount of cash the user 185 wants to deposit, for example.

In response to the cash deposit request, the institution system 105 may generate a barcode similar to the barcode 195 for example, and provide the barcode to the user 185. In an implementation, the barcode may comprise information directed to the amount of cash that the user 185 has requested to deposit in the deposit account 180. In an implementation, the barcode may be electronically provided (e.g., by the website 118, by email, facsimile, instant message, text message, web chat, etc.) to the computing device 187 as a barcode 189. The barcode 189 may be provided as output on an output device of the computing device 187, such as displayed on a display of the computing device 187 (e.g., on a display of a mobile device) or printed out from a printer of the computing device 187.

The barcode 189 may be a unique one-time barcode (the barcode can only be used once, to make one cash deposit and cannot be used to make any further deposits) that may scan at the merchant 160 as a "deposit to user deposit account", for example. In an implementation, the barcode 189 is uniquely generated and may have an expiration date. Thus, if the user 185 does not make the cash deposit using the barcode 189 prior to the expiration date, the user 185 will not be able to make a cash deposit using the barcode 189 because the barcode 189 is no longer valid.

The user 185 may go the merchant 160 and present or otherwise display the barcode 189 to the merchant 160 (e.g., on a mobile phone display or as a printout). The merchant 160 may use the barcode reader 164 to read the barcode 189 and obtain data that may be used in the deposit, as described further herein.

Thus, a presentation instrument may comprise a barcode. For example, the deposit card 190 may act as a presentation instrument and comprise the barcode 195, and the mobile phone display or printout of the barcode 189 may also act as a presentation instrument.

The institution system 105 may include a user interface module 120, a cash deposit engine 121, and a data source access engine 137. The user interface module 120 may generate and format one or more pages of content 119 as a unified graphical presentation that may be provided to the computing device 187, or another user computing device such as a PC or any other computing device, as an output from the cash deposit engine 121. In an implementation, the page(s) of content 119 may be provided to the computing device 187 via a secure website 118 associated with the institution system 105. On the website 118, the user 185 may be presented with information pertaining to the deposit account 180, the deposit card 190, and/or making a cash deposit, as described further herein.

The cash deposit engine 121 may comprise a card generation module 122 that may generate and issue a deposit card 190 for the user 185, e.g., responsive to a user request for the deposit card 190. The cash deposit engine 121 may comprise a barcode generation module 124 that may generate a barcode for a cash deposit and provide the barcode, such as the barcode 189 or the barcode 195, to the user 185. The cash deposit engine 121 may comprise a card to account translation module 126 that may translate the card number and/or other card data of the deposit card 190, barcode 195, or barcode 189 into an account number and/or other account data of the deposit account 180 for deposit of the cash into the deposit account 180.

In an implementation, the cash deposit engine 121 may obtain data from internal data source(s) 139 and/or external data source(s) 141 by the data source access engine 137. The cash deposit engine 121 has access to data, files, and documents pertaining to the user 185 as well as any other data, files, and documents that are currently stored by the institution system 105 as well as external data, files, and documents that may be useful in the generation and issuance of the deposit card 190 for the user 185, the generation of a barcode, such as the barcode 189 or the barcode 195, for a cash deposit, providing the barcode to the user 185, and translating card data of the deposit card 190 into account data of the deposit account 180.

Data pertaining to the user 185 and/or the user account(s) may be retrieved from internal data source(s) 139 and/or external data source(s) 141. Internal data source(s) 139 may contain data, metadata, email, files, and/or documents that the institution system 105 maintains pertaining to the user 185, such as personal data such as name, physical address, email address, etc., as well as other account information. The retrieved data may be stored centrally, perhaps in storage 108.

Information may also be provided to the institution system 105 from the user 185, the merchant 160, and the card processor 170.

A user access system may be communicatively coupled to the cash deposit engine 121 and may be configured to send machine-readable instructions to the cash deposit engine 121. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to deposit card, barcode, and cash deposit data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein. An example computing device and its components are described in more detail with respect to FIG. 5.

Examples of software modules 109 may include modules that may be used in conjunction with receiving and processing an application for the deposit card 190 for the user 185, issuing the deposit card 190 to the user 185, receiving a request for a barcode from the user 185, processing a deposit into the deposit account 180, generating web page content for display, and receiving instructions from the user 185, for example. While specific functionality is described herein as occurring with respect to specific modules, the functionality may likewise be performed by more, fewer, or other modules.

Figure 2:
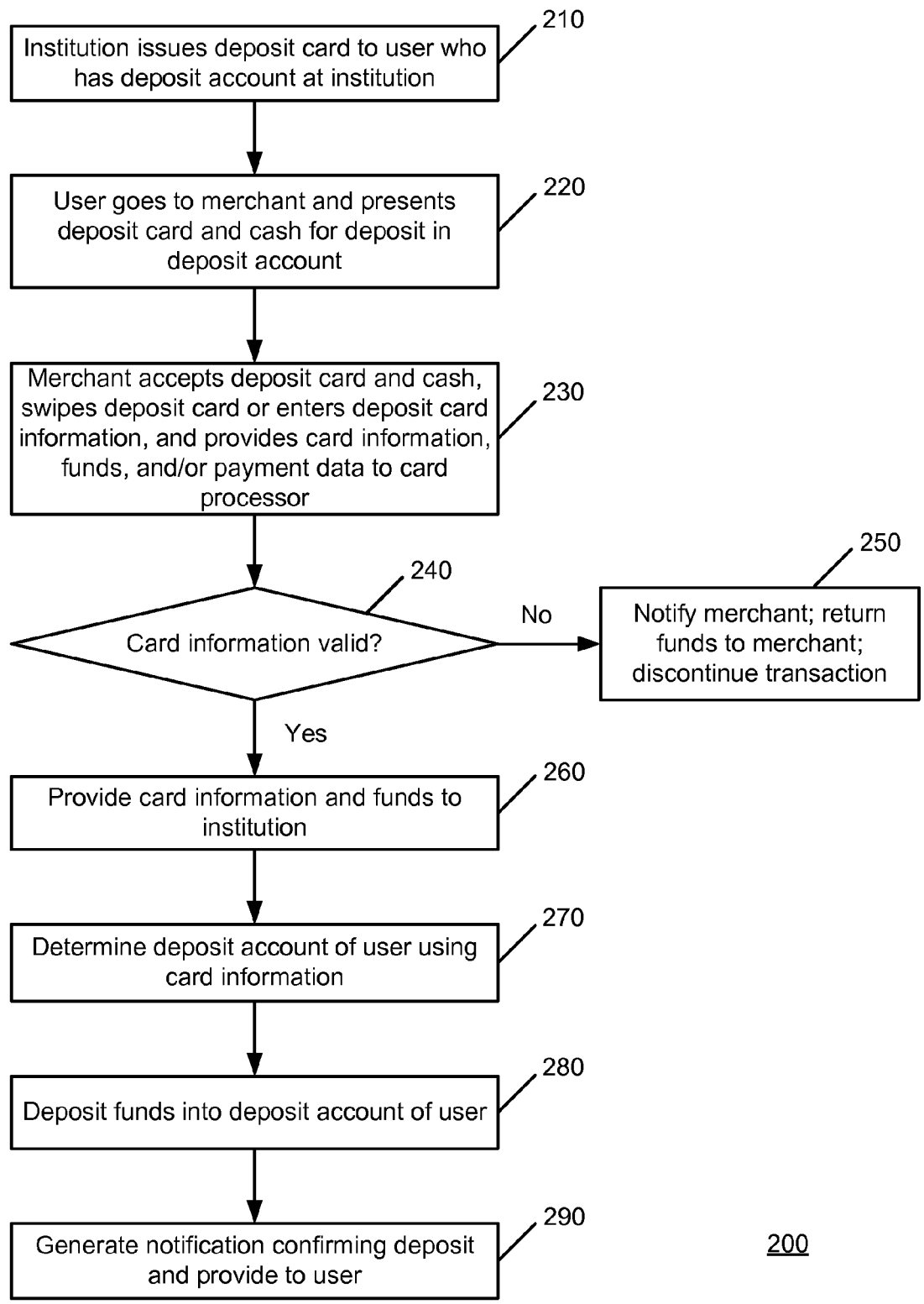
FIG. 2 is an operational flow of an implementation of a method that may be used to deposit cash into a deposit account.

FIG. 2 is an operational flow of an implementation of a method 200 that may be used to deposit cash into a deposit account. At 210, a deposit card such as the deposit card 190 may be issued by an institution such as the institution 102 to a user 185 who has a deposit account 180 at the institution 102.

At some point, at 220, the user 185 may go to a merchant 160 and present the deposit card 190 and cash to the merchant 160 for deposit in the deposit account 180 that is associated with the card number on the deposit card 190. In an implementation, the user 185 may be considered to purchase a "cash deposit into the user's deposit account" or an equivalent from the merchant 160 for the amount of cash to be deposited into the deposit account 180. The merchant 160 may charge a surcharge for this type of service, and the institution 102 may refund the amount of the surcharge to the user 185 after the deposit is made to the deposit account 180.

At 230, the merchant 160 may accept the deposit card 190 and the cash and provide the card information and funds associated with the cash (or payment data, depending on the implementation) to a card processor such as the card processor 170. The merchant 160 may swipe the deposit card 190 through a card reader to obtain card information and/or enter card information manually into a merchant computing device 166.

At 240, the card processor 170 may receive the card information and may determine if the card information is valid. Any known technique(s) for determining the validity of card information over an electronic funds network may be used. In an implementation, the card processor 170 may also receive the funds or payment data relating to the funds. If the card information is invalid, at 250, the merchant 160 may be notified, the funds may be returned to the merchant 160, and the deposit transaction may be discontinued. The cash may be returned to the user 185. In an implementation, the card processor 170 may check any transaction limits associated with the deposit card 190 to confirm that funds may be deposited.

At 260, if the card information is valid, the card information, funds, and/or payment data may be provided to the institution 102, e.g., by the payment processor 170. At 270, the institution 102 may determine the deposit account 180 of the user 185 using the card information. The institution 102 may translate the card number of the deposit card 190 into an account number of the deposit account 180, e.g., by retrieving a database record from storage associated with the card number, where the database record comprises the account number of the deposit account 180 tied to the deposit card 190 having that card number.

At 280, the funds may be deposited into the deposit account 180. At 290, a notification may be generated and provided to the user 185 confirming that the funds have been deposited into the deposit account 180. The notification may be sent by any technique(s), such as via a website such as the website 118, email, text message, instant message, web chat, phone, facsimile, mail, and the like.

Figure 3:
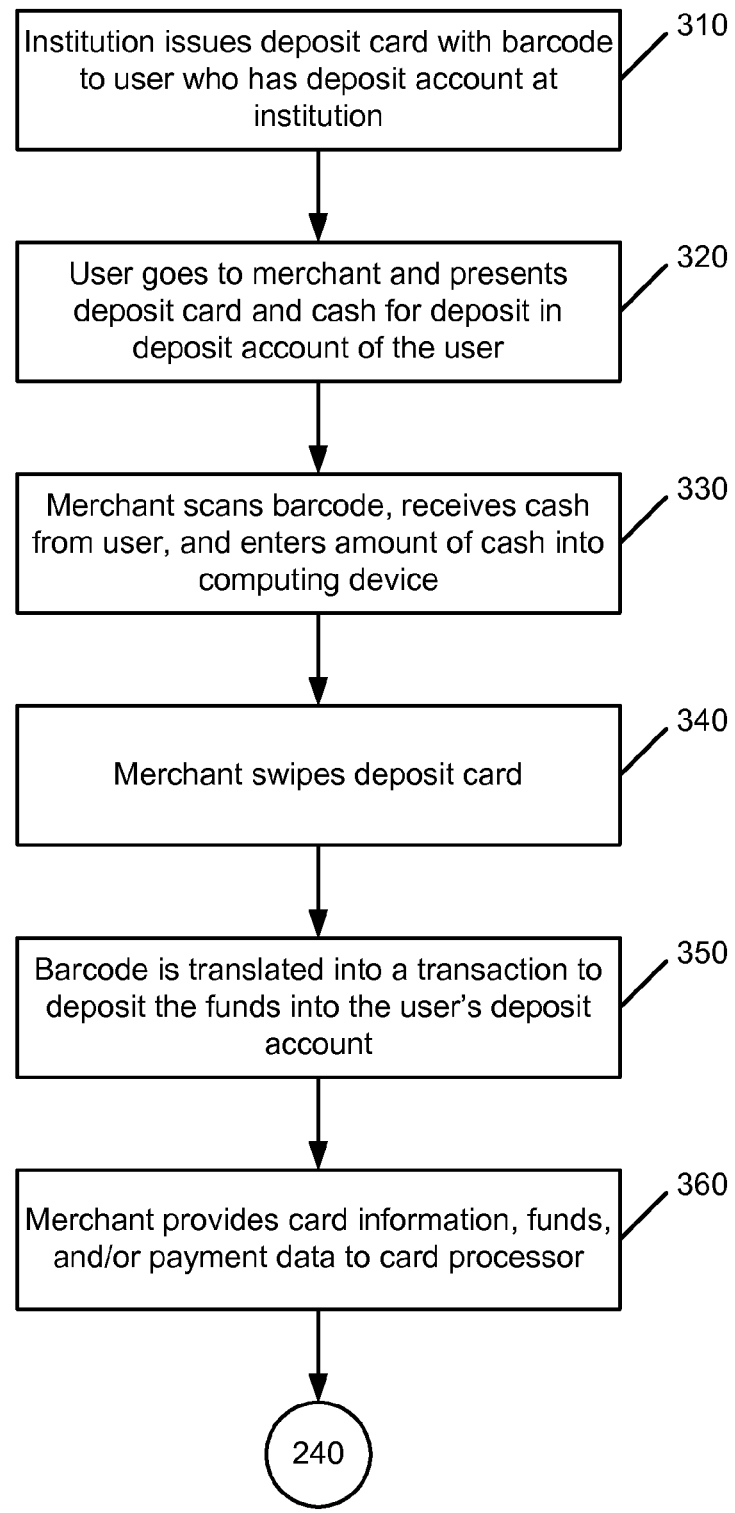
FIG. 3 is an operational flow of another implementation of a method that may be used to deposit cash into a deposit account.

FIG. 3 is an operational flow of another implementation of a method 300 that may be used to deposit cash into a deposit account. At 310, a deposit card, such as the deposit card 190, may be issued by an institution 102 to a user 185 who has a deposit account 180 at the institution 102. The deposit card 190 may have a barcode, such as the barcode 195, displayed thereon. For example, the barcode 195 may be printed on a surface of the deposit card 190. The barcode 195 may correspond to a transaction to deposit funds (e.g., cash) into the deposit account 180 at the institution 102.

At 320, the user 185 may go to a merchant 160 and present the deposit card 190 and cash to the merchant 160 for deposit in the deposit account 180 that is associated with the card number on the deposit card 190. At 330, the merchant 160 may scan the barcode 195 on the deposit card 190 into a merchant computing device 166 (using a barcode reader or scanner, such as the barcode reader 164, for example), receive cash from the user 185 for deposit, and enter the amount of the cash to be deposited into the merchant computing device 166. The barcode 195 may correspond to an item directed to depositing cash into the user's deposit account 180.

At 340, the merchant 160 may swipe the card, e.g., with a card reader of the merchant computing device 166 to obtain card information. At 350, the barcode 195 may be translated into a transaction to deposit the funds into the deposit account 180 of the user 185. At 360, card information, funds associated with the cash, and/or payment data may be provided to a card processor such as the card processor 170. Processing may proceed at 240 as described above with respect to the method 200.

Figure 4:
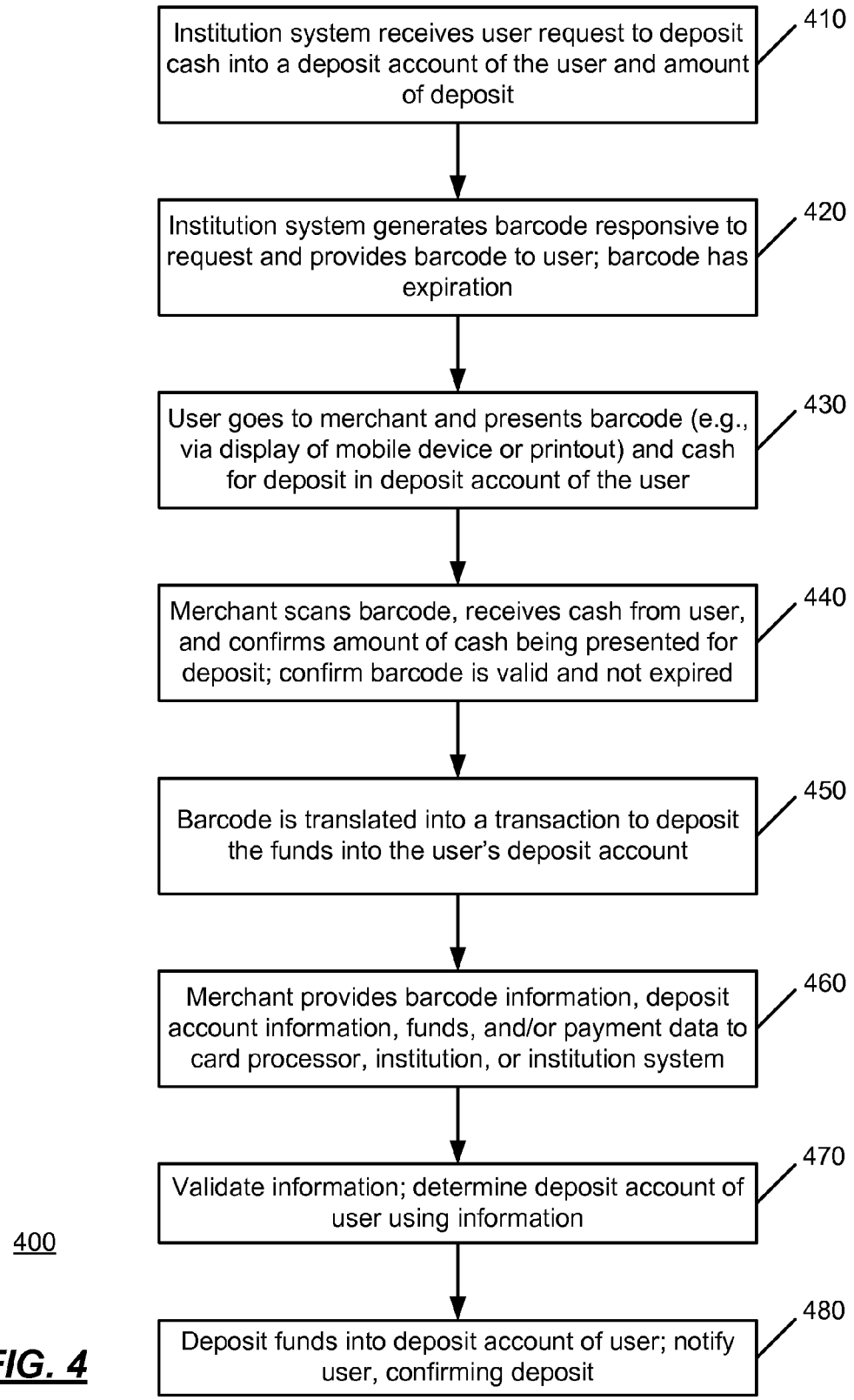
FIG. 4 is an operational flow of another implementation of a method that may be used to deposit cash into a deposit account.

FIG. 4 is an operational flow of another implementation of a method 400 that may be used to deposit cash into a deposit account. At 410, a user 185 may communicate with an institution system, such as the institution system 105, and request a cash deposit into a deposit account 180 of the user 185. In an implementation, the request may include an amount of the cash deposit. In an implementation, the request may include an identifier of the merchant 160 where the user 185 may make the deposit. The request may be received by the institution system 105.

At 420, the institution system 105 may generate a barcode responsive to the request and provide the barcode, such as the barcode 189, to the user, e.g., via a user computing device such as the computing device 187. The barcode 189 may be printed out by the user 185 or may be retained on the computing device 187 such as in storage of the computing device 187.

In an implementation, the barcode 189 may be a unique barcode and comprise identifying information pertaining to the user 185, the deposit account 180, the institution 102, the amount of the cash deposit, and/or an identifier of the merchant 160 where the deposit may be made. The barcode 189 may have an expiration date and/or time (e.g., 24 hours, 72 hours, 1 week, etc.), after which date and/or time the barcode 189 expires and cannot be used to make a cash deposit into the deposit account 180. If the merchant 160 is identified by the user 185 (e.g., at 410), the institution system 105 may provide a notification to the merchant 160 that the user 185 has requested to make a deposit via the merchant 160. Information pertaining to the requested deposit may be provided to the merchant 160. In this manner, the merchant 160 may be notified that at some point, the user 185 may make a deposit via the merchant 160.

At 430, the user 185 may go to a merchant 160 and present the barcode 189 and cash to the merchant 160 for deposit in the deposit account 180 that is identified in the barcode 189. The user 185 may present the barcode 189 by displaying the barcode 189 to the merchant 160 via a display of the computing device 187 or another computing device (e.g., a mobile device, such as a PDA, a mobile phone, a smartphone, a handheld computing device, etc.) or via a printout of the barcode 189, for example.

At 440, the merchant 160 may scan the barcode 189 into a merchant computing device 166 and receive the cash from the user 185. In an implementation, the barcode 189 may comprise information as to how much cash is being deposited. The merchant 160 may confirm that the amount of cash that the user 185 is providing for deposit matches the information provided in the barcode 189. It may also be confirmed that the barcode 189 is still valid for making the cash deposit into the deposit account 180 and that the barcode 189 has not expired.

At 450, the barcode 189 may be translated into a transaction to deposit the funds into the deposit account 180. In an implementation, at 460, the merchant may provide barcode information, deposit account information (from the barcode, for example), funds, and/or payment data to a card processor 170, the institution 102, or the institution system 105, where the information may be validated and the deposit account 180 of the user 185 may be determined at 470. In an implementation, the card processor 170 may be affiliated with the institution 102. Some or all of the operations described herein with respect to the card processor 170 may be performed by the institution 102 and/or the institution system 105. At 480, the funds may be deposited into the deposit account 180 and a notification may be generated and provided to the user 185 confirming that the funds have been deposited into the deposit account 180.

In an implementation, the user 185 may also be issued a receipt number or confirmation number when receiving the barcode 189 or confirming the request for a cash deposit. The user 185 may provide the receipt number or confirmation number to the merchant 160 when depositing funds.

It will be appreciated that the preceding examples are for purposes of illustration and explanation only, and that an embodiment is not limited to such examples.

Figure 5:
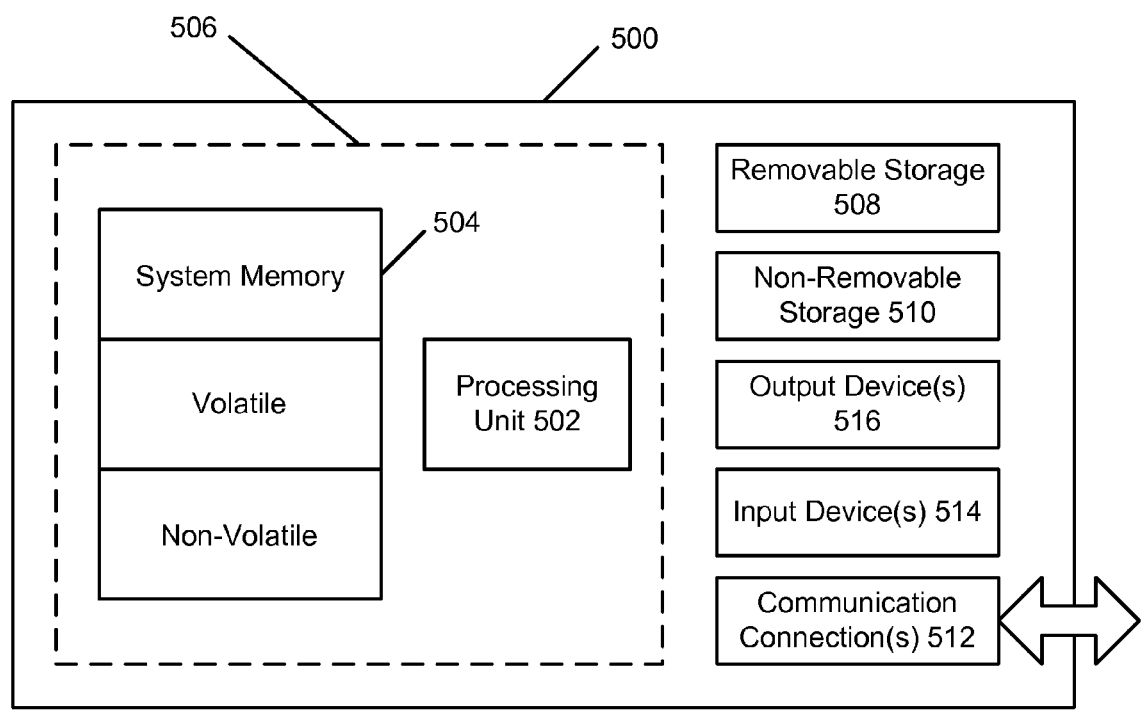
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and system memory 504. Depending on the exact configuration and type of computing device, system memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by computing device 500 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 504, removable storage 508, and non-removable storage 510 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also contain communication connection(s) 512 that allow the computing device 500 to communicate with other devices. Communication connection(s) 512 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for depositing cash, comprising:
   at least one subsystem that provides a barcode to a user, the barcode corresponding to a cash deposit into a deposit account of the user and comprising information corresponding to the deposit account of the user;
   at least one subsystem that receives data responsive to a request from the user to deposit an amount of cash into the deposit account, the data obtained from the barcode and cash obtained from the user for deposit into the deposit account of the user;
   wherein the information comprised within the barcode comprises information pertaining to the amount of cash to be deposited; and
   at least one subsystem that deposits funds associated with the amount of cash into the deposit account of the user.

2. The system of claim 1, wherein the barcode is disposed on a deposit card that only allows for deposits by the user into the deposit account of the user.

3. The system of claim 1, wherein the at least one subsystem that provides the barcode to the user comprises at least one subsystem that sends the barcode to a computing device of the user.

4. The system of claim 1, wherein the barcode has an expiration, and wherein data pertaining to the expiration is comprised within the barcode.

5. The system of claim 4, further comprising at least one subsystem that determines whether the barcode has expired prior to depositing the funds into the deposit account of the user, the funds only being deposited into the deposit account if the barcode is valid in view of the expiration.

6. The system of claim 1, wherein the barcode is directed to a one-time deposit of only the amount of cash into the deposit account of the user.

7. The system of claim 1, wherein the barcode comprises information directed to the amount of cash to be deposited, the funds only being deposited into the deposit account if the amount of cash to be deposited matches the cash obtained from the user for deposit into the deposit account of the user.

8. A system for depositing cash, comprising:
   at least one subsystem that receives a barcode corresponding to a cash deposit from a user, the barcode being issued to the user and comprising information corresponding to a deposit account of the user;
   at least one subsystem that obtains the information from the barcode using a barcode reader;
   wherein the information comprised within the barcode comprises information pertaining to an amount of cash to be deposited;
   at least one subsystem that receives the amount of cash from the user; and
   at least one subsystem that provides the information from the barcode and funds associated with the amount of cash to a card processor for deposit of the funds in the deposit account.

9. The system of claim 8, wherein the barcode is disposed on a deposit card, the deposit card only allowing the user to make the cash deposit to the deposit account.

10. The system of claim 8, wherein the barcode is received from a computing device of the user.

11. The system of claim 10, wherein the computing device is a mobile device and the barcode is received from a display of the mobile device.

12. The system of claim 8, further comprising at least one subsystem that confirms that the amount of cash received from the user matches the amount of cash to be deposited in the information comprised within the barcode.

13. The system of claim 8, wherein the barcode is unique to the user and the amount of cash to be deposited, and the barcode can only be used once.

14. A system for depositing cash, comprising:
   at least one subsystem that receives a request from a user to deposit cash into a deposit account of the user;
   at least one subsystem that generates a barcode responsive to the request;
   wherein the request to deposit cash comprises information pertaining to an amount of cash to be deposited and wherein the barcode comprises the information pertaining to the amount of cash to be deposited;
   at least one subsystem that provides the barcode to a computing device of the user; and
   at least one subsystem that deposits funds associated with the amount of cash into the deposit account of the user responsive to receiving data pertaining to the barcode from a merchant that the barcode is presented to.

15. The system of claim 14, further comprising at least one subsystem that confirms that an amount of the funds being deposited matches the amount of cash to be deposited comprised in the information pertaining to the amount of cash to be deposited.

16. The system of claim 14, wherein the barcode has an expiration and further comprising at least one subsystem that determines whether the barcode has expired prior to depositing the funds, the funds only being deposited into the deposit account if the barcode is valid in view of the expiration.

17. The system of claim 14, wherein the barcode is unique.

18. The system of claim 14, wherein the barcode can only be used once.

19. The system of claim 14, wherein the computing device of the user is a mobile device.

* * * * *